US008239524B2

(12) United States Patent
Arimilli et al.

(10) Patent No.: US 8,239,524 B2
(45) Date of Patent: *Aug. 7, 2012

(54) TECHNIQUES FOR DYNAMICALLY ASSIGNING JOBS TO PROCESSORS IN A CLUSTER BASED ON PROCESSOR WORKLOAD (75) Inventors: Lakshminarayana Baba Arimilli, Austin, TX (US); Ravi Kumar Arimilli, Austin, TX (US); Claude Basso, Raleigh, NC (US); Jean L. Calvignac, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 417 days.

This patent is subject to a terminal disclaimer.

(21) Appl. No.: 12/336,256

(22) Filed: Dec. 16, 2008

(65) Prior Publication Data
US 2010/0153541 A1  Jun. 17, 2010

(51) Int. Cl.
*G06F 15/16* (2006.01)
*G06F 15/173* (2006.01)
(52) U.S. Cl. ........................ 709/224; 709/201
(58) Field of Classification Search .......... 709/201–206, 709/223–226
See application file for complete search history.

(56) References Cited

U.S. PATENT DOCUMENTS

| | | | |
|---|---|---|---|
| 5,539,883 A * | 7/1996 | Allon et al. ................ 718/105 | |
| 5,640,584 A | 6/1997 | Kandasamy et al. | |
| 5,841,973 A * | 11/1998 | Kessler et al. .............. 709/250 | |
| 5,878,241 A | 3/1999 | Wilkinson et al. | |
| 6,038,651 A | 3/2000 | VanHuben et al. | |
| 6,047,323 A | 4/2000 | Krause | |
| 6,154,765 A | 11/2000 | Hart | |
| 6,226,734 B1 | 5/2001 | Kleinsorge et al. | |
| 6,266,745 B1 * | 7/2001 | de Backer et al. ............ 711/147 |
| 6,269,390 B1 * | 7/2001 | Boland ........................ 718/100 |
| 6,389,451 B1 | 5/2002 | Hart | |
| 6,393,386 B1 | 5/2002 | Zager et al. | |
| 6,799,202 B1 | 9/2004 | Hankinson et al. | |
| 7,051,115 B2 | 5/2006 | Chen et al. | |
| 7,289,939 B2 | 10/2007 | Cascaval et al. | |
| 7,290,040 B2 | 10/2007 | Newcombe et al. | |
| 7,389,506 B1 | 6/2008 | Miller et al. | |
| 7,712,080 B2 * | 5/2010 | Pan et al. ..................... 717/119 |
| 7,761,876 B2 * | 7/2010 | Oliveira ....................... 718/105 |
| 2002/0143923 A1 * | 10/2002 | Alexander ................... 709/223 |
| 2003/0172290 A1 | 9/2003 | Newcombe et al. | |
| 2005/0027880 A1 * | 2/2005 | Emmot ........................ 709/238 |
| 2006/0002385 A1 * | 1/2006 | Johnsen et al. .............. 370/389 |
| 2006/0133369 A1 | 6/2006 | Zhang | |
| 2006/0168254 A1 * | 7/2006 | Norton et al. ................ 709/229 |
| 2007/0198785 A1 * | 8/2007 | Kogge et al. ................. 711/154 |

(Continued)

OTHER PUBLICATIONS

Shashidhara, Hosahally, WO 2008/142705 A2, Nov. 27, 2008.*

(Continued)

*Primary Examiner* — Joshua Joo
(74) *Attorney, Agent, or Firm* — Yudell Isidore Ng Russell PLLC (57) ABSTRACT A technique for operating a high performance computing (HPC) cluster includes monitoring workloads of multiple processors included in the HPC cluster. The HPC cluster includes multiple nodes that each include two or more of the multiple processors. One or more threads assigned to one or more of the multiple processors are moved to a different one of the multiple processors based on the workloads of the multiple processors.

17 Claims, 7 Drawing Sheets

U.S. PATENT DOCUMENTS

| | | | |
|---|---|---|---|
| 2008/0016374 A1* | 1/2008 | Gee et al. ............. | 713/300 |
| 2009/0187915 A1* | 7/2009 | Chew et al. ............ | 718/104 |
| 2010/0153541 A1 | 6/2010 | Arimilli et al. | |
| 2010/0153542 A1 | 6/2010 | Arimilli et al. | |
| 2010/0153965 A1 | 6/2010 | Arimilli et al. | |
| 2010/0153966 A1 | 6/2010 | Arimilli et al. | |
| 2010/0223262 A1 | 9/2010 | Krylov et al. | |

OTHER PUBLICATIONS

Schmollinger et al., Designing Parallel Algorithms for Hierarchical SMP Clusters, International Journal of Foundations of Computer Science, AN-7724447, vol. 14, No. 1, p. 59-78, Feb. 2003, World Scientific.

Cirou et al., Programming Irregular Scientific Algorithms with Static Properties on Clusters of SMP Nodes, Proceedings of the 2005 International Conference on Parallel Processing Workshops, AN-8588466, IEEE 2005.

Shen et al., Adaptive Two-level Thread Management for Fast MPI Execution on Shared Memory Machines, p. 1-19, SC 1999, Portland, Oregon, ACM 1999.

Tang et al., Program Transformation and Runtime Support for Threaded MPI Execution on Shared-Memory Machines, ACM Transactions on Programming Languages and Systems, vol. 22, No. 4, Jul. 2000, p. 673-700.

Jinhui et al., A Co-allocation Strategy for Jobs in Multiple HPC Clusters, Proceedings of the 19th International Conference on Parallel and Distributed Computing Systems, San Francisco, Ca, Sep. 20-22, 2006, International Society for Computers and Their Applications, Cary, NC 2006.

Squillante et al., Modeling and Analysis of Dynamic Coscheduling in Parallel and Distributed Environments, ACM 2001.

Zhuang et al., Power-Efficient Prefetching for Embedded Processors, ACM Transactions on Embedded Computing Systems, vol. 6, No. 1, Article 3, Feb. 2007.

Kumar et al., Single-ISA Heterogenous Multi-Core Architectures for Multithreaded Workload Performance, Proceedings of the 31st Annual International Symposium on Computer Architecture, IEEE 2004.

Wu, et al., Tunable Randomization for Load Management in Shared-Disk Clusters, ACM Transactions on Storage, vol. 1, No. 1, Dec. 2004, pp. 108-131.

Kouril et al., A Parallel Backtracking Framework (BkFr) for Single and Multiple Clusters, CF 2004, Apr. 14-16, 2004, Ischia, Italy, ACM 2004.

Koop et al., High Performance MPI Design using Unreliable Datagram for Ultra-Scale InfiniBand Clusters, ICS '07 Jun. 18-20, Seattle, WA, ACM 2007.

Coulter, K.—Office Action dated Sep. 14, 2010; U.S. Appl. No. 12/336,312.

U.S. Appl. No. 12/336,312, "Techniques for Dynamically Assigning Jobs to Processors in a Cluster Based on Broadcast Information", Notice of Allowance dated Sep. 20, 2011.

L.B. Arimilli—Office Action dated Apr. 1, 2011; U.S. Appl. No. 12/336,312.

U.S. Appl. No. 12/336,312, "Techniques for Dynamically Assigning Jobs to Processors in a Cluster Based on Broadcast Information," Notice of Allowance dated Oct. 12, 2011.

* cited by examiner

TECHNIQUES FOR DYNAMICALLY ASSIGNING JOBS TO PROCESSORS IN A CLUSTER BASED ON PROCESSOR WORKLOAD

This invention was made with United States Government support under Agreement No. HR0011-07-9-0002 awarded by DARPA. The Government has certain rights in the invention.

CROSS-REFERENCE TO RELATED APPLICATIONS

The present application is related to the following commonly assigned patent applications: U.S. patent application Ser. No. 12/336,302, entitled "TECHNIQUES FOR DYNAMICALLY ASSIGNING JOBS TO PROCESSORS IN A CLUSTER BASED ON INTER-THREAD COMMUNICATION" by Ravi K. Arimilli et al.; U.S. patent application Ser. No. 12/336,312, entitled "TECHNIQUES FOR DYNAMICALLY ASSIGNING JOBS TO PROCESSORS IN A CLUSTER BASED ON BROADCAST INFORMATION" by Ravi K. Arimilli et al.; and U.S. patent application Ser. No. 12/336,329, entitled "TECHNIQUES FOR DYNAMICALLY ASSIGNING JOBS TO PROCESSORS IN A CLUSTER USING LOCAL JOB TABLES" by Ravi K. Arimilli et al., all of which were filed on even date herewith and are incorporated herein by reference in their entirety for all purposes.

BACKGROUND

1. Field

This disclosure relates generally to a high performance computing cluster and, more specifically to techniques for dynamically assigning jobs to processors in a high performance computing cluster.

2. Related Art

The term high performance computing (HPC) has typically been used to refer to a parallel computing system that includes multiple processors linked together with commercially available interconnects. Usually, computing systems that operate at or above the teraflops ($10^9$ floating point operations/second) region are considered HPC systems. HPC systems increasingly dominate the world of supercomputing due to their flexibility, power, and relatively low cost. HPC has commonly been associated scientific research and engineering applications. Recently, HPC has been applied to business uses of cluster-based supercomputers, e.g., data warehouses, line-of-business (LOB) applications, and transaction processing. A computer cluster is a group of loosely coupled computers that closely work together. The components of a computer cluster are frequently connected to each other through fast local area networks (LANs). Computer clusters are usually deployed to improve performance and/or availability over that provided by a single computer, while typically being much more cost-effective than single computers of comparable speed and/or availability.

A number of commercially available software applications are known that perform job scheduling for computer systems. For example, Portable Batch System™ is a software application that performs job scheduling. A primary task of Portable Batch System™ is to allocate batch jobs among available computing resources. Portable Batch System™ is supported as a job scheduler mechanism by several meta schedulers, which are designed to optimize computational workloads by combining multiple distributed resource managers into a single aggregated manager, allowing batch jobs to be directed to a best location for execution. As another example, LoadLeveler™ is a software application that performs job scheduling for batch jobs, while attempting to match job requirements with a best available computer resource for execution. As yet another example, Load Sharing Facility™ is another software application that performs job scheduling.

Message passing interface (MPI), which has been employed in computer clusters, is an application programmer interface (API) that facilitates communication between processors of a computer cluster. MPI includes point-to-point message passing and collective (global) operations, which may be directed to a user-specified group of processes. MPI has become the de facto standard for communication among processes that model a parallel program running on a distributed memory system. MPI provides a communication library that enables parallel programs to be written in various programming languages, e.g., C, C++, Fortran, etc. The advantages of MPI over older message passing libraries are portability (due to the fact that MPI has been implemented for almost every distributed memory architecture) and speed (as each implementation is in principle optimized for the hardware on which it runs).

There are two versions of MPI that are currently popular: MPI-1, which emphasizes message passing and employs a static runtime environment; and MPI-2, which also includes features such as parallel input/output (I/O), dynamic process management, and remote memory operations. MPI is often compared with parallel virtual machine (PVM), which is a legacy message passing system that provided motivation for standard parallel message passing systems such as MPI. PVM is an open source software application that employs transmission control protocol/internet protocol (TCP/IP) network communications to create a virtual supercomputer (i.e., an HPC cluster) using TCP/IP connected computer systems.

The MPI interface is designed to provide virtual topology, synchronization, and communication functionality between a set of processes (that have been mapped to processors) in a language independent way, with language specific syntax (bindings). Each process may be mapped to a different processor as part of a mapping activity, which usually occurs at runtime, through an agent that starts the MPI API. MPI facilitates point-to-point rendezvous-type send/receive operations, choosing between a Cartesian or graph-like logical process topology, exchanging data between process pairs (send/receive operations), combining partial results of computations (gathering and reduction operations), synchronizing processor nodes (barrier operations), as well as obtaining network-related information such as the number of processes in a computing session, current processor identity to which a process is mapped, neighboring processes accessible in a logical topology, etc.

MPI also specifies thread safe interfaces, which have cohesion and coupling strategies that usually avoid manipulation of unsafe hidden states within the interface. Multi-threaded collective communication may be accomplished by using multiple copies of communicators, which are groups of processes in an MPI session. In general, the groups of processes each have rank order and their own virtual communication fabric for point-to-point operations. Communicators also have independent communication addressability for collective communication. MPI groups are mainly utilized to organize and reorganize subsets of processes, before another communicator is made. MPI facilitates single group intra-communicator operations, as well as bi-partite (two-group) inter-communicator operations. In MPI-1, single group operations are most prevalent. In MPI-2 bi-partite operations are more widely employed to facilitate collective communication and dynamic process management.

Communicators can be partitioned using several commands in MPI, these commands include a graph-coloring-type algorithm (MPI_COMM_SPLIT), which is commonly used to derive topological and other logical subgroupings in an efficient way. A number of important functions in the MPI API involve communication between two specific processes. For example, an MPI_Send interface allows one specified process to send a message to a second specified process. Point-to-point operations are particularly useful in master-slave program architectures, where a master node might be responsible for managing data-flow of a collection of slave nodes. Typically, the master node sends specific batches of instructions or data to each slave node, and possibly merge results upon completion. Collective functions in the MPI API involve communication between all processes in a process group (which may include an entire process pool or a program-defined subset).

An MPI_Bcast call (MPI broadcast) takes data from one specially identified node and sends that message to all processes in a process group. A reverse operation is the MPI_Reduce call, which is designed to take data from all processes in a group, perform a user-chosen operation (like summing), and store the results on one individual node. This MPI_Reduce call is also useful in master-slave architectures, where a master node may want to sum results from all slave nodes to arrive at a final result.

Researches have proposed implementing MPI directly into hardware of a system by building MPI operations into microcircuitry of random access memory (RAM) chips in each node. Another approach has proposed adding hardware acceleration to one or more parts of an MPI operation. For example, MPI queues may be processed with hardware or remote direct memory access (RDMA) may be employed to directly transfer data between memory and a network interface without processor or kernel intervention. Many MPI implementations allow multiple, different, executables to be started in the same MPI job. A process may be mapped to N physical processors, where N is the total number of processors available, or something in between. For maximum potential for parallel speedup, more processors are used, but the ability to separate the mapping from program design is an essential value for development, as well as for practical situations where resources are limited.

New architectures are being developed that have greater internal concurrency (multi-core), better fine-grain concurrency control (multi-threading), and more levels of memory hierarchy. This has resulted in separate complementary standards for symmetric multiprocessors (SMPs), e.g., OpenMP™. In general, the MPI standard provides little guidance on how multi-threaded programs should be written. While multi-threaded capable MPI implementations exist, multi-threaded message passing applications are somewhat limited.

SUMMARY

According to another aspect of the present disclosure, a technique for operating a high performance computing (HPC) cluster includes monitoring workloads of multiple processors included in the HPC cluster. The HPC cluster includes multiple nodes that each include two or more of the multiple processors. One or more threads assigned to one or more of the multiple processors are moved to a different one of the multiple processors based on the workloads of the multiple processors.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

DETAILED DESCRIPTION

As will be appreciated by one of ordinary skill in the art, the present invention may be embodied as a method, system, device, or computer program product. Accordingly, the present invention may take the form of an entirely hardware embodiment, an entirely software embodiment (including firmware, resident software, microcode, etc.) or an embodiment combining software and hardware aspects that may all generally be referred to herein as a circuit, module, or system. The present invention may, for example, take the form of a computer program product on a computer-usable storage medium having computer-usable program code, e.g., in the form of one or more design files, embodied in the medium.

Any suitable computer-usable or computer-readable storage medium may be utilized. The computer-usable or computer-readable storage medium may be, for example, but is not limited to, an electronic, magnetic, optical, electromagnetic, infrared, or semiconductor system, apparatus, or device. More specific examples (a non-exhaustive list) of the computer-readable storage medium includes the following: a portable computer diskette, a hard disk, a random access memory (RAM), a read-only memory (ROM), an erasable programmable read-only memory (EPROM) or flash memory, a portable compact disc read-only memory (CD-ROM), an optical storage device, or a magnetic storage device. As used herein the term "coupled" includes a direct electrical connection between elements or blocks and an indirect electrical connection between elements or blocks achieved using one or more intervening elements or blocks.

According to various aspects of the present disclosure, a technique for performing high performance computing (HPC), or network computing, is described herein that employs monitoring hardware that dynamically modifies job assignments for processors in an HPC cluster. Each node of the cluster may include one or more symmetric multiprocessors (SMPs). For example, threads associated with a job may be assigned (or re-assigned) to processors based on individual processor loads and network traffic. As used herein, the term "job" is a collection of threads that perform parallel computing.

According to various aspects of the present disclosure, a supercomputer topology is known and is duplicated in multiple local job tables (e.g., one job table per node). At power-on, an original topology of the supercomputer may be examined and local job tables may be modified based on what components of the supercomputer are currently functional (e.g., local job tables may be modified to account for faulty connections attributable to broken network cables, etc.). According to various aspects of the present disclosure, the local job tables maintain a current supercomputer topology in conjunction with processor utilization and network utilization information.

An initial job assignment may be performed by any number of different techniques. For example, an initial job assignment may be performed by a job scheduler such as Loadlever™. As one example, a job scheduler that maps jobs to an HPC topology that includes eighty processors (that can each handle two threads) may parallelize the jobs into one-hundred sixty threads. The job scheduler then initially determines which threads to assign to which processor of a node, where each node may run threads from one or more jobs. In a typical situation, each of the threads are assigned to one or more groups (based on, for example, which threads communicate with each other) and the one or more groups are utilized in determining how threads are assigned to the processors. For example, each of the one-hundred sixty threads may be included in one or more of eighteen groups. As one example, group 3 may include threads sixty-nine and one-hundred nine and group 12 may include threads one through twenty, sixty-nine, and eighty-five. In this case, the threads within groups 3 and 12 would usually be assigned to a same node or adjacent nodes (i.e., nodes within one hop of each other).

In conventional job scheduling, thread assignment is static and, in this case, if threads are assigned to processors in a less than ideal manner, performance of an associated supercomputer will not be ideal as fast threads (within a job) that have completed execution are required to wait on slow threads (within the job) that have not completed execution at barriers. According to various aspects of the present disclosure, monitoring hardware is employed that determines where a thread should execute (i.e., on what processor and in what node) on an on-going basis.

The monitoring hardware snoops information flow and is configured to periodically evaluate processor utilization and network utilization in determining whether a thread (or a portion of a thread) should be re-assigned to another processor. In general, threads that frequently communicate should be assigned to processors that are in relative close proximity (e.g., within a same node) in order to reduce network traffic. According to various aspects of the present disclosure, respective local job tables, which include current global information related to processor and network utilization of a topology, are maintained in each node. For example, a periodic strobe (e.g., corresponding to an MPI broadcast) from each processor to all processors may be utilized to update the global information maintained in the local job tables. In this manner, each node in a supercomputer is periodically updated with recent processor and network utilization information on other nodes in the supercomputer.

In general, it is desirable for each node (e.g., including eight chips each of which include eight processors in an SMP configuration) to acquire at least two-level knowledge of neighbor nodes in order to facilitate re-assignment of threads (or portions of threads) to/from a node. For example, a single thread may be cracked into multiple threads and one or more of the multiple threads may be distributed to another processor, based on current processor loads. The nodes may be, for example, arranged in a three-dimensional (3D) Torus topology. In this case, each node monitors its own traffic and may be a middleman for traffic from other nodes. In the 3D Torus topology, each processor in a supercomputer is only a few hops from any other processor in the supercomputer.

In any event, during operation of the supercomputer the network communications are snooped and related threads are moved closer together by redistributing one or more of the related threads a different processor. When a thread is moved to another processor, the monitoring hardware saves a state (effective address (EA), processor registers, etc.) of the thread. Traditionally, when a job hits a barrier (e.g., every ten microseconds), the threads within a job communicate with one another. As noted above, when a single thread within a job has not completed its task, all other threads in the job wait to communicate. The threads may communicate, for example, using a message passing interface (MPI) in conjunction with a host channel adapter (HCA). Alternatively, the threads may transfer information between processors in different nodes using TCP/IP. In either case, processing power of a supercomputer is wasted when threads of a job do not complete at substantially the same time.

According to one aspect of the present disclosure, a technique for operating a high performance computing (HPC) cluster includes monitoring workloads of multiple processors included in the HPC cluster. The HPC cluster includes multiple nodes that each include two or more of the multiple processors. Workload information for the multiple processors is periodically updated in respective local job tables maintained in each of the multiple nodes. Based on the workload information in the respective local job tables, one or more threads are periodically moved to a different one of the multiple processors.

According to another aspect of the present disclosure, a technique for operating an HPC cluster includes monitoring workloads of multiple processors included in the HPC cluster. The HPC cluster includes multiple nodes that each include two or more of the multiple processors. One or more threads assigned to one or more of the multiple processors are moved to a different one of the multiple processors based on the workloads of the multiple processors.

According to one embodiment of the present disclosure, a technique for operating an HPC cluster includes monitoring communication between threads assigned to multiple processors included in the HPC cluster. The HPC cluster includes multiple nodes that each include two or more of the multiple processors. One or more of the threads are moved to a different one of the multiple processors based on the communication between the threads.

According to another embodiment of the present disclosure, a technique for operating an HPC cluster having multiple nodes (each of which include multiple processors) includes periodically broadcasting information, related to processor utilization and network utilization at each of the multiple nodes, from each of the multiple nodes to remaining ones of the multiple nodes. Respective local job tables maintained in each of the multiple nodes are updated based on the broadcast information. One or more threads are then moved from one or more of the multiple processors to a different one of the multiple processors (based on the broadcast information in the respective local job tables).

Figure 1:
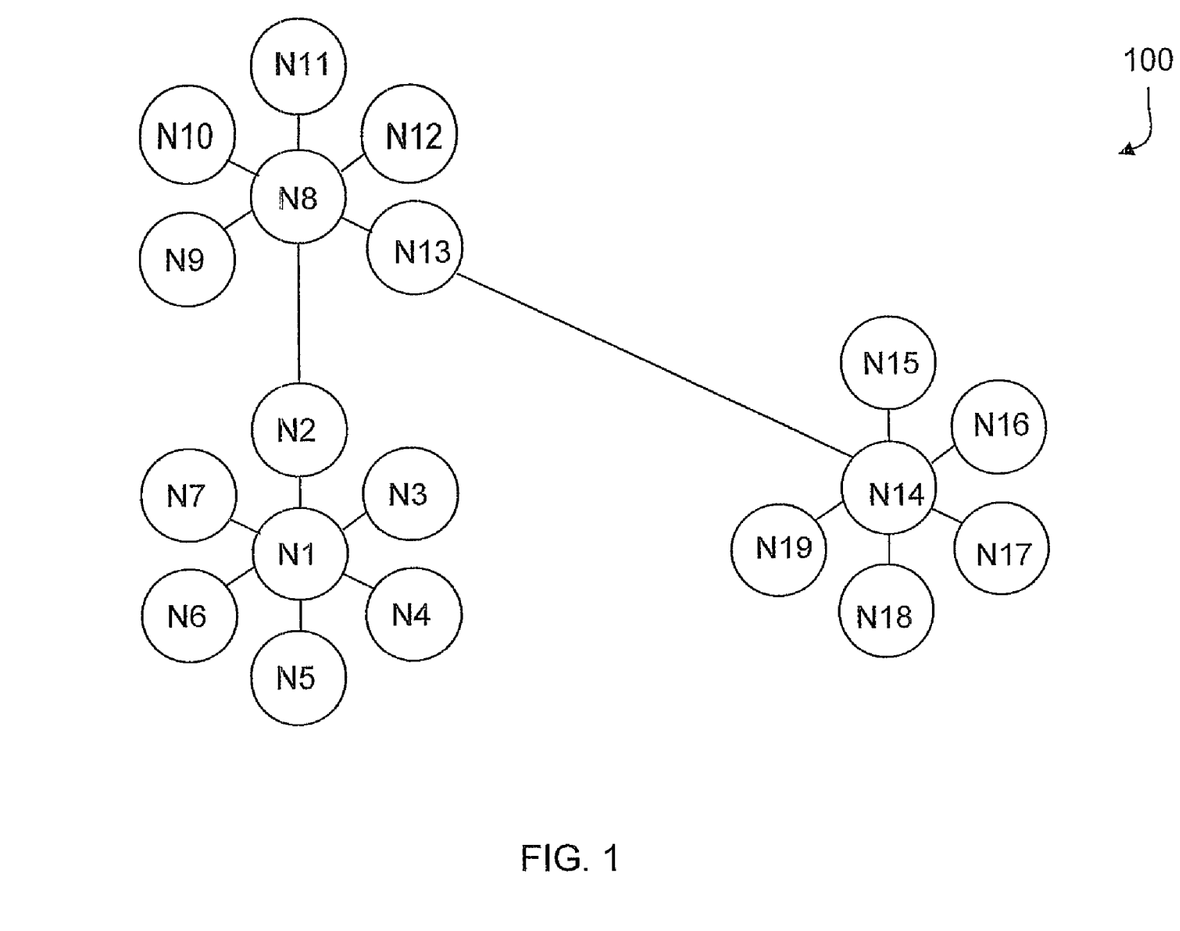
FIG. 1 is a diagram of an example high performance computing (HPC) cluster that includes a number of nodes, each of which include one or more processors whose loads may be dynamically assigned or re-assigned according to various aspects of the present disclosure.
Figure 2:
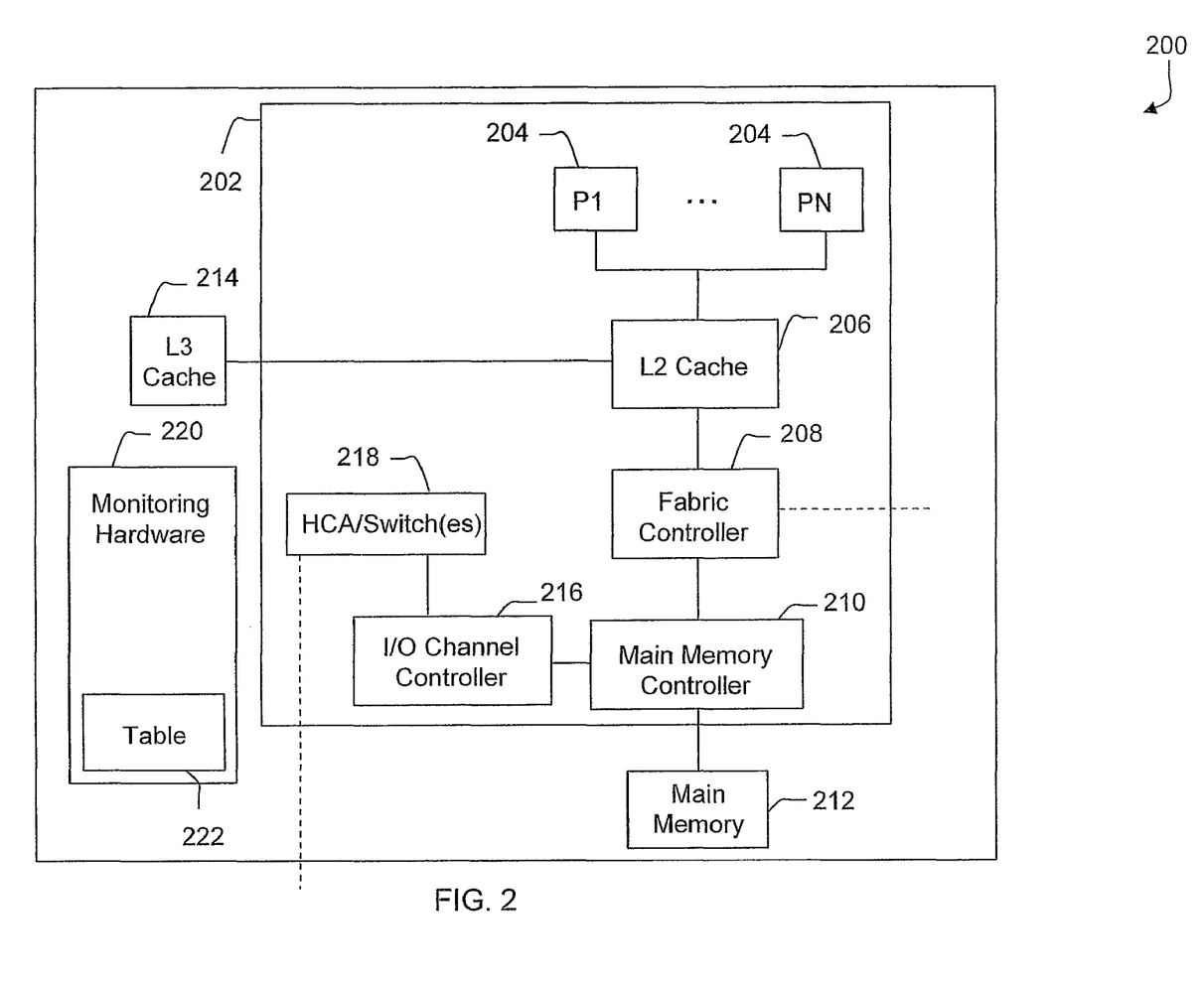
FIG. 2 is a diagram of a relevant portion of an example symmetric multiprocessor (SMP) included in one of the nodes of FIG. 1, according to various embodiments of the present disclosure.

With reference to FIG. 1, an example topology for a relevant portion of an example HPC cluster (supercomputer) 100 includes a number of nodes (N1-N18) that are connected in a three-dimensional (3D) Torus topology. With reference to FIG. 2, each of the nodes of FIG. 1 may include a processor system, such as the processor system 200. As is illustrated, the processor system 200 includes at least one chip-level multi-processor (CMP) 202 (only one of which is illustrated in FIG. 2), each of which includes multiple (e.g., two to eight processor cores) processors 204. The CMP 202 may correspond to, for example, a node (or a portion of a node) of the HPC cluster 100.

The processors 204 may, for example, operate in a simultaneous multithreading (SMT) mode or a single thread (ST) mode. When the processors 204 operate in the SMT mode, the processors 204 may employ multiple separate instruction fetch address registers to store program counters for multiple threads. In at least one embodiment, the processors 204 each include a first level (L1) cache memory (not separately shown in FIG. 2) that is coupled to a shared second level (L2) cache memory (cache) 206, which is coupled to a shared third level (L3) cache 214 and a fabric controller 208.

As is illustrated, the fabric controller 208 is coupled to a memory controller (e.g., included in a Northbridge) 210, which is coupled to a memory subsystem 212. In alternative embodiments, the fabric controller 208 may be omitted and, in this case, the L2 cache 206 may be directly connected to the main memory controller 210. The memory subsystem 212 includes an application appropriate amount of volatile and non-volatile memory. The fabric controller 208, when implemented, facilitates communication between different CMPs and between the processors 204 and the memory subsystem 212 and, in this manner, functions as an interface.

It should be appreciated that the various techniques disclosed herein are equally applicable to systems that employ separate L2 caches for each processor, as well as systems that employ separate L2 and L3 caches for each processor. Each of the L1, L2, and L3 caches may be combined instruction and data caches or correspond to separate instruction and data caches. As is shown in FIG. 2, the main memory controller 210 is also coupled to an I/O channel controller (e.g., included in a Southbridge) 216, which is coupled to a host channel adapter (HCA)/switch(es) block 218. The HCA/switch(es) block 218 includes an HCA and one or more switches that may be utilized to couple the CMP 202 to CMPs in other nodes (e.g., I/O subsystem nodes and processor nodes) of the cluster 100. As is illustrated, monitoring hardware 220, which includes a local job table 222, is provided to monitor processor and network utilization in each node. The processor and network utilization information is stored in the table 222 and is utilized by the monitoring hardware 220 in determining whether threads in a node should be reassigned to a different processor (in the node or a different node). The monitoring hardware 220 is configured to periodically broadcast processor and network utilization information regarding an associated node to all other nodes in the cluster 100. In this manner, the local job tables in each of the nodes are periodically updated with processor and network utilization information from all other nodes.

Figure 3:
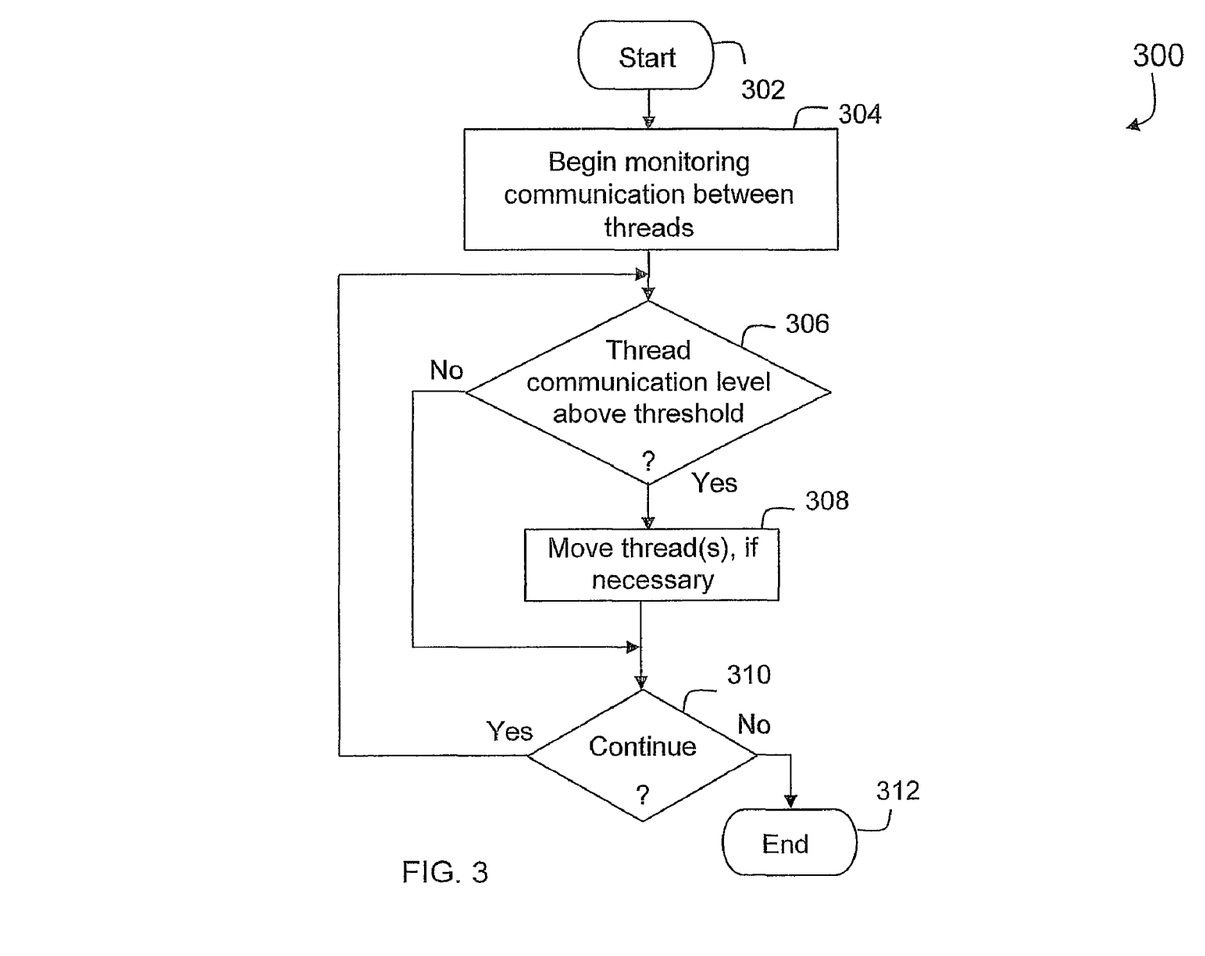
FIG. 3 is a flowchart of an example process for dynamically assigning threads to processors of an HPC cluster, according to one aspect of the present disclosure.

With reference to FIG. 3, a flowchart of an example process 300 for moving threads between processors of a supercomputer, according to one embodiment of the present disclosure, is illustrated. In block 302 the process 300 is initiated, at which point control transfers to block 304. In block 304, monitoring hardware (e.g. in each node) begins monitoring (snooping) communication between threads that are executing on the processors of the supercomputer. Next, in decision block 306, the monitoring hardware determines if a thread communication level between various threads executing on the supercomputer is above a threshold level (e.g., more than one communication every ten microseconds). In general, the threshold level is set to minimize communication between threads that are more than, for example, two hops from each other. That is, threads that communicate frequently should be run on processors that are relatively close (e.g., within a same node or an adjacent node) to reduce network traffic. If the thread communication level is not above the threshold level in block 306, control transfers to block 310. If the thread communication level is above the threshold level in block 306, control transfers to block 308. In block 308, threads that communicate above the threshold level are moved to processors that are physically closer to each other. Next, in decision block 310, the monitoring hardware determines if assigned jobs are complete. If the assigned jobs are not complete in block 310, control transfers to block 306, where monitoring of inter-thread communication is continued. If the assigned jobs are complete in block 310, control transfers to block 312, where the process 300 terminates until additional jobs are assigned to the supercomputer for execution.

Figure 4:
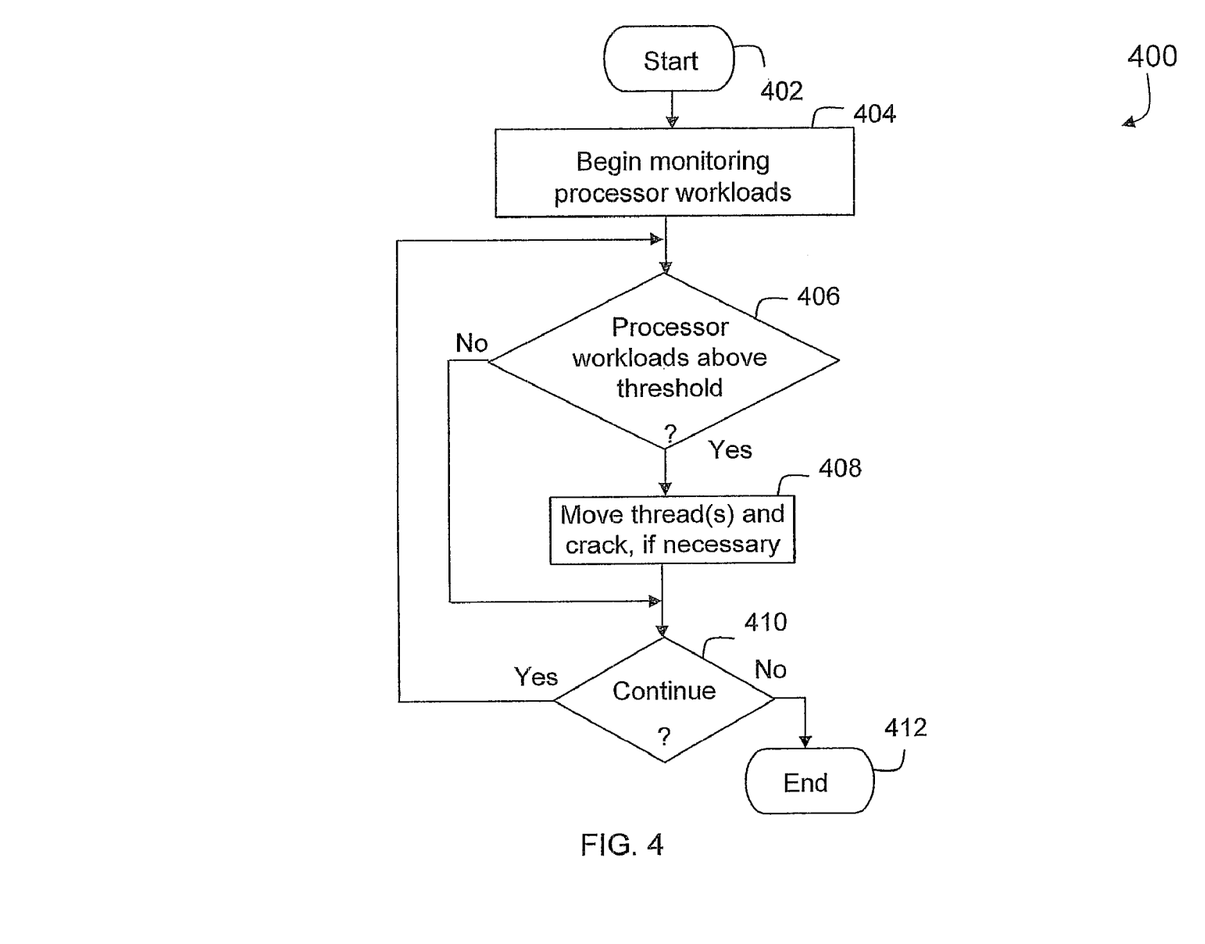
FIG. 4 is a flowchart of an example process for dynamically assigning threads to processors of an HPC cluster, according to one aspect of the present disclosure.

With reference to FIG. 4, a flowchart of an example process 400 for moving threads between processors of a supercomputer, according to another embodiment of the present disclosure, is illustrated. In block 402 the process 400 is initiated, at which point control transfers to block 404. In block 404, monitoring hardware (e.g. in each node) begins monitoring (snooping) processor workloads of the processors of the supercomputer. Next, in decision block 406, the monitoring hardware determines if any of the processor workloads are above a threshold level (e.g., more than ninety percent processor utilization during a ten microsecond time period). In general, the threshold level is set in an attempt to balance the processor workloads, such that the processors that are working on a same job finish the job at substantially the same time. If the processor workloads (utilization levels) are not above the threshold level in block 406, control transfers to block 410. If the processor workloads (utilization levels) are above the threshold level in block 406 control transfers to block 408. In block 408, one or more threads from the processors that are over-utilized are re-assigned to processors that are under-utilized. If necessary, or desirable, threads may be cracked with portions of the cracked threads re-assigned to a different one of the processors. Next, in decision block 410, the monitoring hardware determines if assigned jobs are complete. If the assigned jobs are not complete in block 410, control transfers to block 406. If the assigned jobs are complete in block 410, control transfers to block 412, where the process 400 terminates until additional jobs are assigned to the supercomputer for execution.

Figure 5:
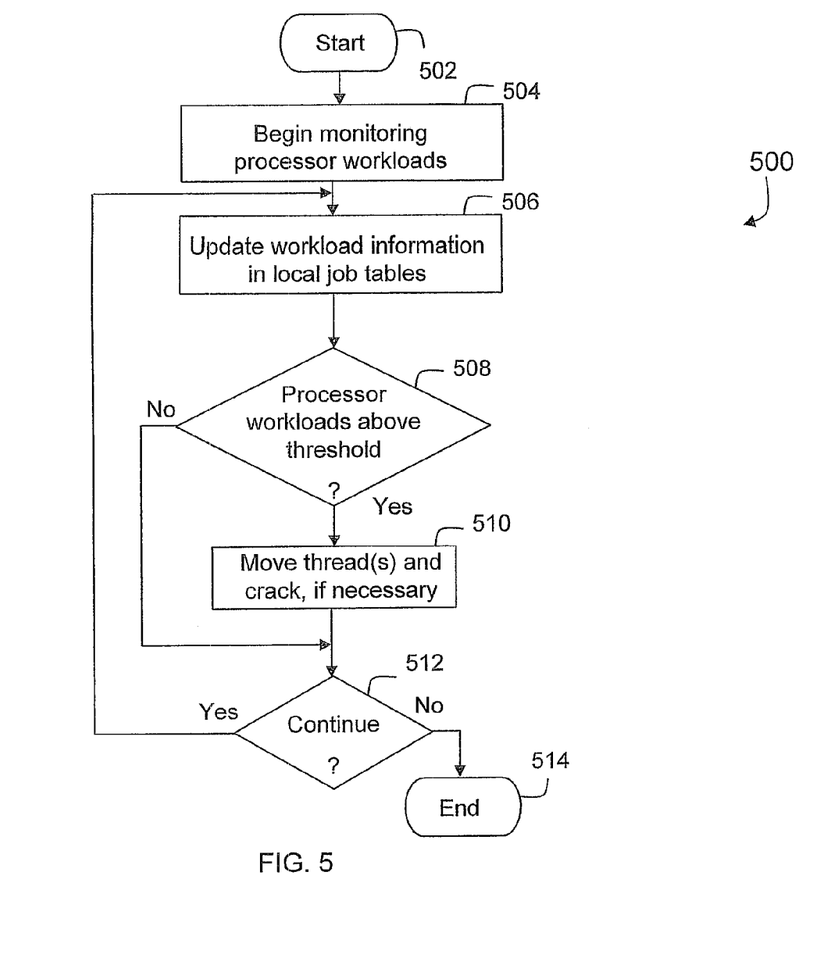
FIG. 5 is a flowchart of an example process for dynamically assigning threads to processors of an HPC cluster, according to another aspect of the present disclosure.

With reference to FIG. 5, a flowchart of an example process 500 for moving threads between processors of a supercomputer, according to one aspect of the present disclosure, is illustrated. In block 502 the process 500 is initiated, at which point control transfers to block 504. In block 504, monitoring hardware (e.g. in each node) begins monitoring (snooping) processor workloads of the processors of the supercomputer. Next, in block 506, the monitoring hardware updates workload information in local job tables. The local job tables maintain a global view of a processor workload of all of the processors in the supercomputer. Then, in decision block 508, the monitoring hardware determines if any of the processor workloads are above a threshold level (e.g., more than ninety percent processor utilization during a ten microsecond time period). In general, the threshold level is set in an attempt to balance the processor workloads such that the processors that are working on a same job finish the job at substantially the same time. If the processor workloads (utilization levels) are not above the threshold level in block 508 control transfers to block 512. If the processor workloads (utilization levels) are above the threshold level in block 508 control transfers to block 510. In block 510, one or more threads from the processors that are over-utilized are re-assigned to processors that are under-utilized. If necessary, or desirable, threads may be cracked with portions of the cracked threads re-assigned to a different one of the processors to more evenly balance the processor loads. Next, in decision block 512, the monitoring hardware determines if assigned jobs are complete. If the assigned jobs are not complete in block 512, control transfers to block 506. If the assigned jobs are complete in block 512, control transfers to block 514, where the process 500 terminates until additional jobs are assigned to the supercomputer for execution.

Figure 6:
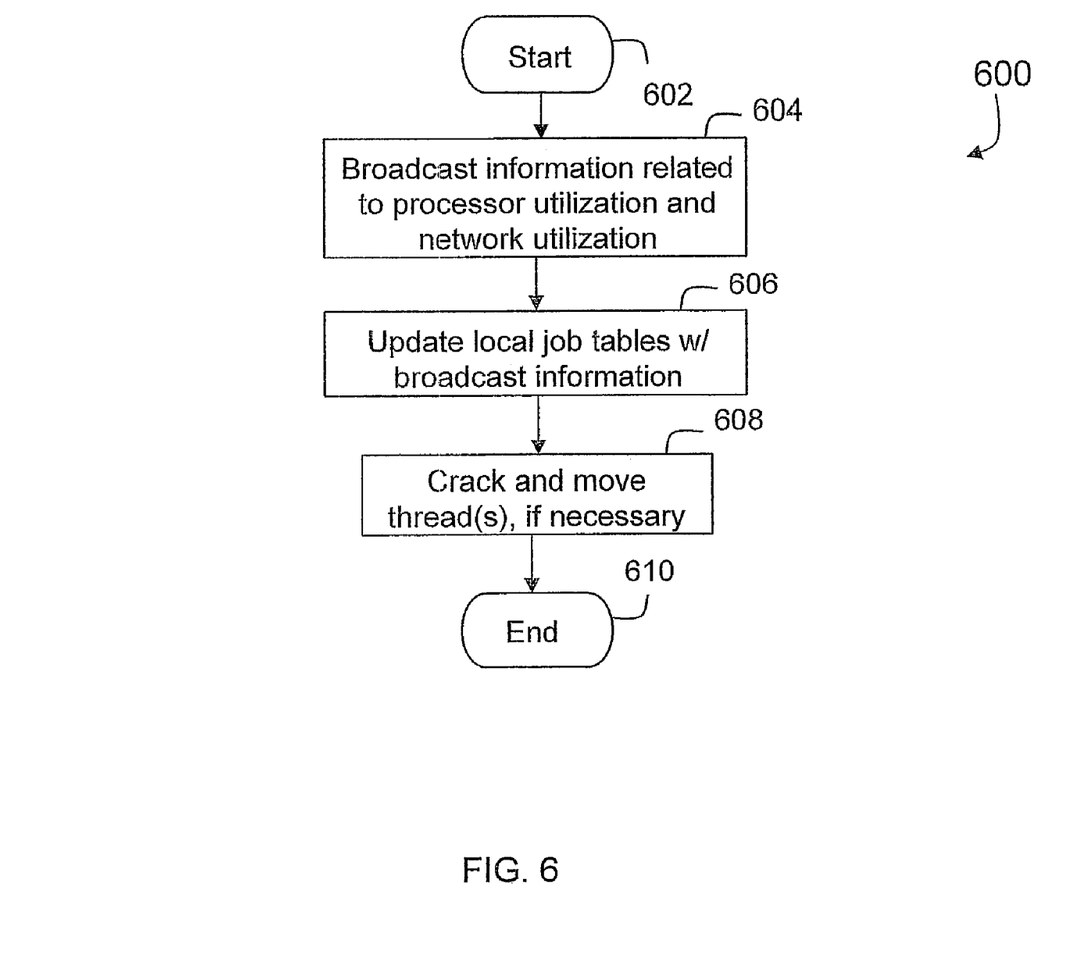
FIG. 6 is a flowchart of an example process for dynamically assigning threads to processors of an HPC cluster, according to yet another aspect of the present disclosure.

With reference to FIG. 6, a flowchart of an example process 600 for moving threads between processors of a supercomputer, according to one aspect of the present disclosure, is illustrated. In block 602 the process 600 is initiated, at which point control transfers to block 604. In block 604, information related to processor utilization and network utilization is broadcast from each node to all remaining nodes. Next, in block 606, monitoring hardware updates processor and network utilization information in local job tables based on the broadcast information. As noted above, the local job tables maintain a global view of a processor workload of all of the processors in the supercomputer and also provide a global view of network utilization. Then, in block 608, threads may be cracked with portions of the cracked threads re-assigned to a different one of the processors to more evenly balance processor loads and reduce network traffic. Next, control transfers to block 610, where the process 600 terminates until the local job tables require update again.

Figure 7:
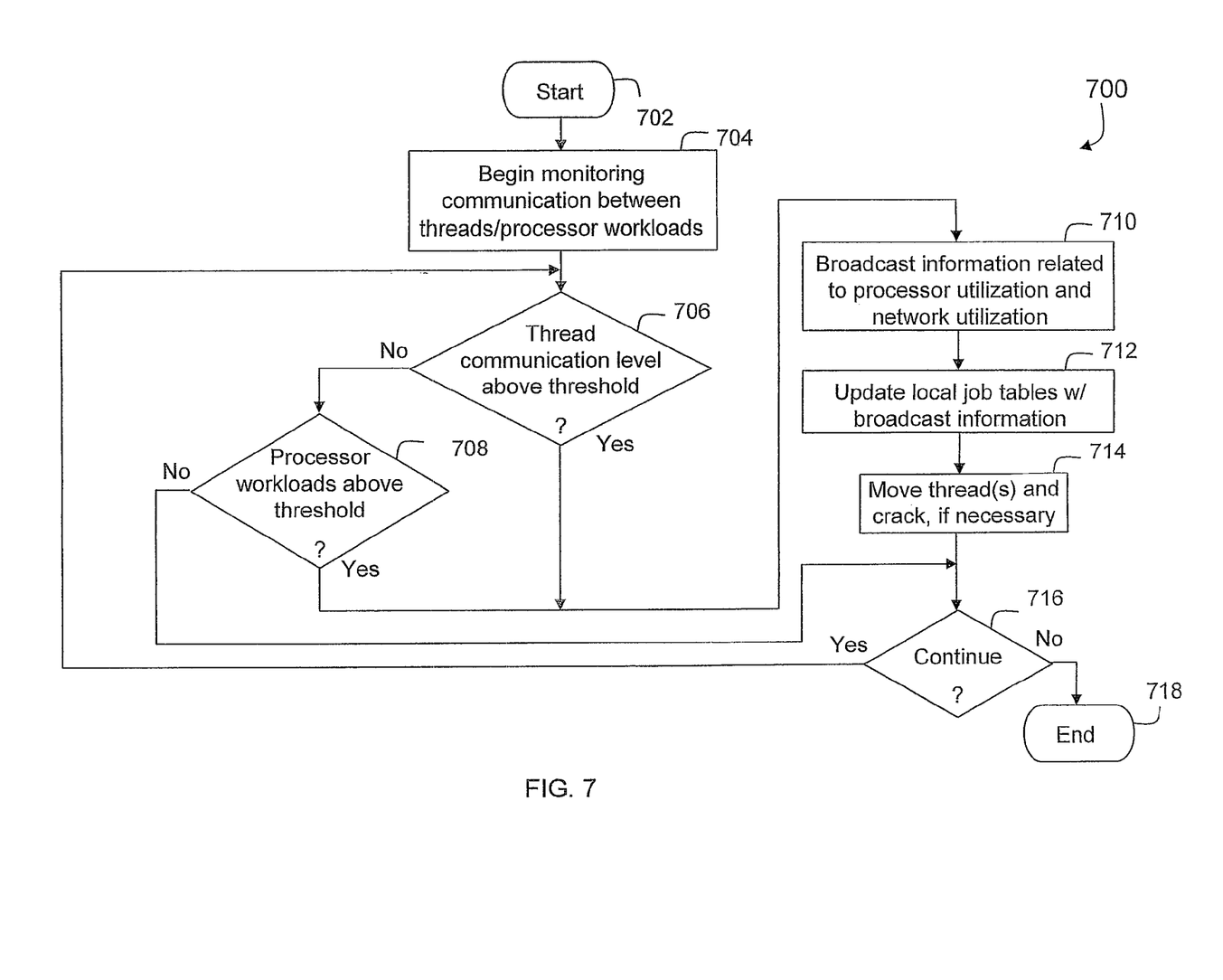
FIG. 7 is a flowchart of an example process for dynamically assigning threads to processors of an HPC cluster, according to a different aspect of the present disclosure.

With reference to FIG. 7, a flowchart of an example process 700 for moving threads between processors of a supercomputer, according to one embodiment of the present disclosure, is illustrated. In block 702 the process 700 is initiated, at which point control transfers to block 704. In block 704, monitoring hardware (e.g. in each node) begins monitoring (snooping) communication between threads that are executing on the processors of the supercomputer and monitoring processor workloads of the processors. Next, in decision block 706, the monitoring hardware determines if a thread communication level between various threads executing on the supercomputer is above a threshold level (e.g., more than one communication every ten microseconds). In general, the threshold level is set to minimize communication between threads that are more than, for example, two hops from each other. That is, threads that communicate frequently should be run on processors that are relatively close (e.g., within a same node or an adjacent node) to reduce network traffic. If the thread communication level is above the threshold level in block 706, control transfers to block 710. If the thread communication level is not above the threshold level in block 706, control transfers to decision block 708. In block 708, the monitoring hardware determines if any of the processor workloads are above a threshold level. If none of the processor workloads are above the threshold level in block 708, control transfers to block 716. If any of the processor workloads are above the threshold level in block 708, control transfers to block 710. In block 710, information related to processor utilization and network utilization is broadcast from each node to all remaining nodes. Next, in block 712, monitoring hardware updates processor and network utilization information in local job tables based on the broadcast information. As noted above, the local job tables maintain a global view of a processor workload of all of the processors in the supercomputer and also provide a global view of network utilization. Then, in block 714, threads may be cracked with portions of the cracked threads re-assigned to a different one of the processors to more evenly balance processor loads and reduce network traffic.

In block 714, threads that communicate above the threshold level are moved to processors that are physically closer to each other. Next, in decision block 716, the monitoring hardware determines if assigned jobs are complete. If the assigned jobs are not complete in block 716, control transfers to block 706. If the assigned jobs are complete in block 716, control transfers to block 718, where the process 700 terminates until additional jobs are assigned to the supercomputer for execution.

Accordingly, a number of techniques have been disclosed herein that readily facilitate dynamic reassignment of threads of jobs that are executing in a high performance computing cluster.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," (and similar terms, such as includes, including, has, having, etc.) are open-ended when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of operating a high performance computing cluster, comprising:
   monitoring workloads of multiple processors, wherein the high performance computing cluster includes multiple nodes that each include two or more of the multiple processors;
   moving one or more threads assigned to one or more of the multiple processors to a different one of the multiple processors based on the workloads of the multiple processors;
   periodically broadcasting information, indicating a level of processor utilization and network utilization at each of the multiple nodes, from each of the multiple nodes to remaining ones of the multiple nodes;
   updating respective local job tables maintained in each of the multiple nodes to maintain a view of the level of processor utilization and network utilization at each of the multiple nodes; and
   moving, based on the broadcast information in the respective local job tables, at least one of the one or more threads to a different one of the multiple processors.

2. The method of claim 1, further comprising: moving one of the one or more threads to a different one of the multiple processors based on communication between the one or more threads.

3. The method of claim 1, wherein the workloads of the multiple processors are based on utilization of one or more floating-point units included within each of the multiple processors.

4. The method of claim 1, further comprising:
   cracking at least one of the one or more threads that is executing on a first processor, included in the multiple processors, based on a first workload of the first processor into at least two secondary threads; and
   moving one of the at least two secondary threads to a second processor, included in the multiple processors, based on a second workload of the second processor.

5. The method of claim 1, wherein the moving further comprises:
   moving identified threads, included in the one or more threads, that communicate above a threshold level to identified processors, included in the multiple processors, that are located physically closer to each other.

6. The method of claim 1, wherein the multiple nodes are arranged in a three-dimensional Torus topology.

7. The method of claim 1, where the multiple processors are included within multiple chip-level multiprocessors.

8. The method of claim 7, wherein at least some of the multiple processors included within different ones of the multiple chip-level multiprocessors are coupled together via host channel adapters and switch fabrics including one or more switches.

9. A high performance computing cluster, comprising:
   multiple nodes that each include multiple processors; and
   monitoring hardware configured to monitor workloads of the multiple processors,
   wherein the high performance computing cluster is configured to move one or more threads assigned to one or more of the multiple processors to a different one of the multiple processors based on the workloads of the multiple processors and periodically broadcast information, indicating a level of processor utilization and network utilization at each of the multiple nodes, from each of the multiple nodes to remaining ones of the multiple nodes and update respective local job tables maintained in each of the multiple nodes to maintain a view of the level of processor utilization and network utilization at each of the multiple nodes, and
   wherein the high performance computing cluster is further configured to move, based on the broadcast information in the respective local job tables, at least one of the one or more threads to a different one of the multiple processors.

10. The high performance computing cluster of claim 9, wherein the high performance computing cluster is further configured to move one of the one or more threads to a different one of the multiple processors based on communication between the one or more threads.

11. The high performance computing cluster of claim 9, wherein the workloads of the multiple processors are based on utilization of one or more floating-point units included within each of the multiple processors.

12. The high performance computing cluster of claim 9, wherein the high performance computing cluster is further configured to crack at least one of the one or more threads that is executing on a first processor, included in the multiple processors, based on a first workload of the first processor into at least two secondary threads and move one of the at least two secondary threads to a second processor, included in the multiple processors, based on a second workload of the second processor.

13. The high performance computing cluster of claim 9, wherein the high performance computing cluster is further configured to move identified threads, included in the one or more threads, that communicate above a threshold level to identified processors, included in the multiple processors, that are located physically closer to each other.

14. The high performance computing cluster of claim 9, wherein the multiple nodes are arranged in a three-dimensional Torus topology.

15. The high performance computing cluster of claim 9, where the multiple processors are included within multiple chip-level multiprocessors.

16. The high performance computing cluster of claim 15, wherein at least some of the multiple processors included within different ones of the multiple chip-level multiprocessors are coupled together via host channel adapters and switch fabrics including one or more switches.

17. A method of operating a high performance computing cluster, comprising:
   monitoring workloads of multiple processors, wherein the high performance computing cluster includes multiple nodes that each include two or more of the multiple processors;
   moving one or more threads assigned to one or more of the multiple processors to a different one of the multiple processors based on the workloads of the multiple processors;

moving one of the one or more threads to a different one of the multiple processors based on communication between the one or more threads;
periodically broadcasting information, indicating a level of processor utilization and network utilization at each of the multiple nodes, from each of the multiple nodes to remaining ones of the multiple nodes;
updating respective local job tables maintained in each of the multiple nodes to maintain a view of the level of processor utilization and network utilization at each of the multiple nodes; and
moving, based on the broadcast information in the respective local job tables, at least one of the one or more threads to a different one of the multiple processors.

* * * * *